US006869658B2

(12) United States Patent
Becker

(10) Patent No.: US 6,869,658 B2
(45) Date of Patent: Mar. 22, 2005

(54) RECORDING MATERIAL BEARING AN EMBEDDED IMAGE

(75) Inventor: Franz Josef Becker, Odenthal (DE)

(73) Assignee: Zanders Feinpapier AG, Bergisch Gladbach (DE)

(*) Notice: Subject to any disclaimer, the term of this patent is extended or adjusted under 35 U.S.C. 154(b) by 111 days.

(21) Appl. No.: 09/952,885

(22) Filed: Sep. 12, 2001

(65) Prior Publication Data

US 2002/0071019 A1 Jun. 13, 2002

(30) Foreign Application Priority Data

Sep. 12, 2000 (EP) ........................................... 00119799

(51) Int. Cl.$^{7}$ ............................ B32B 3/00; B41M 5/40

(52) U.S. Cl. ......................... 428/67; 428/195; 428/199; 428/201; 428/203; 428/204; 428/206; 428/207; 428/211; 428/32.34

(58) Field of Search .......................... 428/32.34–32.37, 428/67, 195, 199, 201, 203, 204, 206, 207, 211

(56) References Cited

U.S. PATENT DOCUMENTS

| | | | | | |
|---|---|---|---|---|---|
| 3,889,270 | A | | 6/1975 | Hoffmann et al. | |
| 4,770,934 | A | * | 9/1988 | Yamasaki et al. | 428/331 |
| 5,580,693 | A | * | 12/1996 | Nakajima et al. | 430/200 |
| 5,863,648 | A | * | 1/1999 | Ohmura et al. | 428/32.37 |
| 6,066,594 | A | | 5/2000 | Gunn et al. | |
| 6,550,909 | B2 | * | 4/2003 | Ichinose et al. | 347/105 |

FOREIGN PATENT DOCUMENTS

| | | | |
|---|---|---|---|
| DE | 23 10 891 | | 9/1973 |
| DE | 36 10 204 A 1 | | 10/1987 |
| DE | 199 56 999 A 1 | | 5/2000 |
| EP | 0 343 794 A2 | | 4/1989 |
| EP | 634 283 A1 | | 6/1994 |
| EP | 0 709 221 A1 | | 10/1995 |
| EP | A 0732219 | | 3/1996 |
| EP | A 0 912 348 | | 7/1997 |
| EP | 0 826 823 A1 | | 8/1997 |
| EP | 0 839 670 A1 | | 10/1997 |
| EP | 0 992 359 A2 | | 10/1999 |
| JP | 63-193886 | * | 8/1988 |
| WO | WO/97/33758 | | 9/1997 |
| WO | WO/98/02313 | | 1/1998 |

* cited by examiner

*Primary Examiner*—Deborah Jones
*Assistant Examiner*—G. Blackwell-Rudasill
(74) *Attorney, Agent, or Firm*—Knobbe, Martens, Olson & Bear, LLP

(57) ABSTRACT

A printable recording material and the method of using the same. The material includes a substrate and at least one functional coating on at least one side of the substrate insuring printability. The coating includes a binder and inorganic pigments in an amount of at least 50% by weight based on the dry weight of the coating. An image can be embedded in the coating.

12 Claims, 1 Drawing Sheet

RECORDING MATERIAL BEARING AN EMBEDDED IMAGE

BACKGROUND OF THE INVENTION

1. Field of the Invention

The present invention refers to a printable recording material having an embedded image and to a process for manufacturing the same.

2. Description of the Related Art

Recently inkjet print processes have been developed in order to improve the quality of the resulting inkjet images so that photographic quality has been almost achieved. To fulfil these requirements inkjet recording materials have been developed having excellent printability especially definition of the inkjet printed image, high-gloss, improved scratch resistance and environmental resistance.

EP-A 0 732 219 and EP-A 0 634 283 refer to high-gloss recording materials made by a cast-coating process. High-gloss with simultaneous improved inkjet printability has been achieved by using pigments of extreme small particle size in the cast-coating.

EP-A 0 709 221 describes a high-gloss cast-coated paper having the additional inkjet receiving coating. This inkjet receiving coating is composed in order to maintain the high-gloss of the base paper combined with an improved ink absorption. These high-gloss cast-coated papers have the disadvantage that the inkjet image applied to these papers is exposed to the environment and therefore susceptible to photochemical, chemical and mechanical attack.

EP-A 992 359 discloses an ink jet paper comprising a substrate, a first ink receiving layer containing inorganic pigments and a binder and a second gloss providing surface layer.

To avoid this disadvantage it has been suggested in the past to cover the already printed recording material either by lamination or impregnation to make the printed image resistant with respect to any kind of environmental attack. Such lamination or impregnation processes are inter alia described in DE 3 610 204, EP-A 0 839 670, EP-A 0 343 794, U.S. Pat. No. 6,066,594 and DE-A 2 310 891. An important draw back of this technology is that an additional lamination or coating step after printing is involved which considerably increases the production costs.

This draw back can be avoided by inkjet recording materials that have a good initial inkjet printability combined with the possibility to change the surface morphology after the printing process. Such inkjet recording materials are known from EP-A 0826 823, DE-A 199 56 999 and EP-A 0 912 348. These inkjet recording materials have in common that they are coated with an inkjet receiving coating comprising as major component thermoplastic pigments. This gives the opportunity that the inkjet recording material after being printed can be subjected to elevated temperatures under pressure in order to fuse the individual thermoplastic pigments into a continuous thermoplastic film that protects the underlying inkjet image from environmental attack.

These inkjet recording materials as well as the prior art using lamination or impregnation to protect the inkjet image have the essential draw back that the surface of the inkjet recording material is sealed to an extend that the sheet is not any longer printable.

U.S. Pat. No. 3,889,270 discloses an ink jet recording material comprising an ink jet receiving layer formed by a molecular disperse or colloidal disperse substance in order to ensure wetting and penetration of the receiving layer by the ink. Embedding of the ink jet image is not described.

From WO 97/33758 an ink jet recording medium comprising a porous hydrophilic membrane and a continuous non-porous hygroscopic layer that may contain pigments in an unspecified amount. In one embodiment the recording medium can be post-treated after application of an ink jet image by for example calendering thereby collapsing the porous structure of the membrane to provide transparency. The purpose of the porous membrane is to ensure absorption of the solvents of the applied ink droplets, whereby the dyes and pigments of the ink still remain on the surface of the medium. Thus collapsing of the porous structure of the membrane does not result in an embedding of the applied ink jet image.

Thus, the object of the present invention is to avoid the disadvantage of the above-described prior art especially is to provide a recording material having already an image applied thereon whereby the gloss of the image is substantially the same as the gloss of the paper not covered by the image and the applied image is protected from environmental attack but at the same time the recording material still remains printable as well to provide a process to manufacture such a recording material.

SUMMARY OF THE INVENTION

This object has been attained by a printable recording material comprising a substrate and at least one functional coating on at least one side of the substrate insuring printability comprising a binder and inorganic pigments in an amount of at least 50 percent by weight based on the dry weight of the coating whereby an image is embedded in the coating.

Furthermore, this object is obtained by a method for manufacturing a printable recording material, comprising a) providing a substrate, b) applying an image on at least one side of the substrate, c) applying on the side(s) of the substrate bearing an image at least one functional coating comprising a binder and inorganic pigments in an amount of at least 50% by weight based on the dry weight of the coating to ensure printability of the recording material, and d) optionally finishing the coated surface.

Alternatively the present invention refers to a method for manufacturing a method for manufacturing a printable recording material comprising a) providing a substrate, b) applying on at least one side of the substrate at least one functional coating comprising a binder and inorganic pigments in an amount of at least 50% by weight based on the dry weight of the coating to ensure printability of the recording material, c) applying an image on (at least one of) the coated surface(s) of the substrate, d) finishing the coated surface bearing an image thereby embedding the image in the coating.

The term “image” in the sense for the present application means any kind of image irrespective whether it is applied by a printing technique such as inkjet printing or otherwise applied and also encompasses uniform coloring of the recording material.

The image can be made of any type of dyes, ink or toner particles. Likewise the method for application of the image onto the recording material is not critical and can be selected from inkjet printing, offset printing, laser printing, gravure or flexographic printing. Manual application of the image is also possible but not preferred in an industrial continuous paper making process. The inkjet process using conventional inks is particularly preferred.

Likewise a specific selection for the substrate to be used in accordance with the present invention is not crucial. But the use of a base paper as substrate in accordance with the present invention is preferred. Any kind of conventional base papers can be used as long as printing, coating and finishing processes are not severely hampered. The term substrate for the purpose of the present invention also encompasses precoated paper. According to a preferred embodiment of the present invention the substrate is a base paper coated with one or more preferably 1–3 most preferably 2 pre-coating layers that may be the same or different from the coating layer as described below. Especially if the image is applied by ink jet techniques a base paper bearing an ink jet receiving coating is the most preferred substrate.

It is preferred that the coating applied to the substrate contains at least 50 weight percent of inorganic pigments based on the total dry weight of the coating in order to make the recording material printable. It is especially preferred if the coating contains at least 70 percent by weight of inorganic pigments.

Suitable pigments are for example: clay, kaolin, aluminum hydroxide, satin white, barium sulfate, milled calcium carbonate, precipitated calcium carbonate, talc, calcined kaolin, titanium dioxide which may be used alone or as mixtures. Additionally plastic pigments may be present as long as the coating contains at least the preferred 50 weight percent, based on the total dry weight of the coating of inorganic pigments. Finally divided pigments having particle size distribution in which at least 50 percent by weight of the particle size of less that 2 $\mu$m are preferred, especially if high-gloss recording material made by a cast-coating process are desired. Organic pigments if present can be included to the coatings in an amount u to 45 weight percent preferably up to 25 weight percent based on the dry weight of the coating.

The coating composition used according to the process of the present invention is preferably an aqueous coating composition and comprises in addition to the inorganic pigments and the optional organic pigment binders customary in coating compositions. Suitable binders are for example synthetic polymer latices, such as styrene/butadiene latex, methyl methacrylate/butadiene latex, styrene/vinyl acetate latex, vinyl acetate/acrylate latex, styrene/acrylate/acrylonitrile latex, water-soluble binders, such as casein, soybean protein, polyvinyl alcohol and suitable copolymer latices, which may be used individually or as mixtures with one another. Starch or starch derivatives are less preferred binders.

Usual additives like dispersions and wetting agents, parting or releasing agents, viscosity modifiers, agents for increasing water resistance, preservatives, dyes and antifoams and ammonium salts or metal salts of inorganic or organic acids, pH adjusters may be present.

Thus, an appropriate coating composition that may be used in the present invention comprises 5 to 50 weight percent, preferably 5 to 40 weight percent, most preferred 5 to 35 weight percent of a binder, 50 to 95 weight percent, preferably 70 to 93 weight percent, most preferred 80 to 93 weight percent of inorganic pigments, 0 to 45 weight percent, preferably 1 to 25 weight percent, most preferred 1 to 15 weight percent of organic pigments and 0 to 10 weight percent, preferably 1 to 8 weight percent, most preferred 1 to 5 weight percent of usual additives, whereby the percentages are based on the total weight of non-volatile in the coating composition.

The solids content of the coating composition, preferably aqueous coating composition, to be applied to the substrate may be from 25 to 70 percent by weight, based on the total weight of the aqueous coating composition, preferably from 30 to 60 weight percent and depends on the method of application to the substrate. This may be for example effected by means of a blade, roll, airknife, rod or engraved coating apparatus. The coating composition is applied to the substrate in an amount such that the dry coating weight is from 5 to 40 gram per square meter, preferably from 10 to 30 gram per square meter. The recording material according to the present invention may have a weight from 60 to 400 grams per square meter, preferably 80 to 250 grams per square meter.

According to one preferred embodiment of the present invention the image is applied onto the substrate prior to application of the coating composition. Thereby, the image is positioned between the substrate and the coating with the result that the image is completely embedded and protected by the coating layer. Thereby a good protection of the image from environmental influences of any kinds can be achieved and due to the presence of a higher amount of inorganic pigments in the coating layer the recording material is still printable.

According to a more preferred embodiment the thus prepared recording material is subjected to an additional finishing step like contacting the coated substrate with a heated cylinder being either highly polished or profiled in a cast-coating process or with a calender roll. Thereby, the transparence of the coating layer can be increased in order to improve the brightness of the underlying image.

By selecting the appropriate finishing step the desired surface appearance of the recording material of the present invention can be achieved.

In case high-gloss of the recording material is desired a cast-coating process is preferred wherein the coated substrate is contacted with a heated highly polished cylinder like a chrome cylinder.

Before being brought into contact with the cylinders surface the aqueous coating composition applied to the substrate may be coagulated and and/or solidified to a gel by exposing the coating composition layer to a coagulation or a gelling bath. The coagulation methods which may be used to set the coating also include heat coagulation and/or heat gelling in which spontaneous solidification of the coating layer occurs. A heat sensitive coating is obtained by adding an appropriate amount of for example salts which contain divalent or polyvalent metal cations and whose dissociation increases under the action of heat. Compared with a direct method which operate without coagulation and gelling of the coating layer higher cylinder temperatures can be used in the coagulation or gel method so that the layer can be more rapidly formed and dried when brought in contact with the cylinder.

It is also possible first to dry the coating applied to the substrate and to re-moisten the coated surface with water before simultaneously being brought into contact with the surface of the heated cylinder. As a result of the re-moistening the dry coating layer achieves a plastic gel state which permits defect-free reproduction of the cylinder surface and defect-free drying of the hot cylinder surface.

In comparison with the direct method and with the coagulation method, however, the moisture content of the layer which is achieved by re-moistening and the plasticity of said layer is slightly lower so that re-moistened layer may require a higher contact pressure on the hot cylinder surface.

In order to achieve sufficient plastification of the re-moistened layer but also to achieve easy removability of the layer from the cylinder in the dried state the aqueous re-moistening solution may contain the known additives customary for this process. Customary additives for release agents such as polyethylenes, ethoxylated polyethylenes, waxes, metal and ammonium salts of aliphatic acids, ketene dimers, surfactants based on fatty acid, sulfonated and sulfated oils and fatty acid triglycerides and dispersants and if required pH adjustors.

The heated cylinder surface may have a temperature from 80° C. to 260° C. In all cast-coating processes (direct, gel and re-wet method) there is the danger that the water evaporates too rapidly in the interior of the base paper thereby damaging the paper structure and/or the coat. This effect is less pronounced in the coagulation or re-wetting method.

Additionally, it has been found that when using a cast-coating process to finish the surface of the recording material, printing inks that are applied in solution especially aqueous solution, are more preferred compared to suspensions. It is believed that evaporation of water during contact of the recording material with the heated cylinder through the base paper is less effected with printing inks based on solutions, compared to suspensions since too coarse ink pigments seem to hamper the transport of water through the recording material during the drying step.

In any event it is a surprising result that aqueous printing inks can be applied in the process of the present invention since irrespective which of the preferred method are used, the applied image will be in some stages of the process be in contact with aqueous systems. Despite that fact it is possible to obtain well defined images that are completely embedded in a coating ensuring printability of the recording material with the result that the applied image will be protected from environmental attack.

Alternatively, to the use of a highly polished chromium cylinder to make a high-gloss cast-coated paper a profiled cylinder can be used in order to achieve a matte finish.

An important advantage of the above-described embodiment is that the applied image is protected by the coating layer, whereby the coating layer by the finishing process has become substantial transparent thereby achieving a high brilliance of the image. In addition the gloss of the paper is constant throughout the entire surface irrespective when looked at a part of the substrate that has not been covered by an image or at the image. Thus, an excellent surface appearance can be achieved. The image is protected from environmental attack and the recording paper is still printable.

In an alternative embodiment of the present invention the coating is first applied on the substrate and thereafter an image is applied by the means as described above onto the coated surface of the substrate. Thereafter, a finishing process is necessary to embed the image into the coating adjacent to the outer surface of the coating.

When using cast-coating methods in order to obtain high-gloss material it is preferred that the coating after application onto the substrate is dried, thereafter the image is applied onto the coating and optionally dried. Then the coating is re-wetted prior to contact with the heated metal cylinder that can be either highly polished in order to obtain a high-gloss finish or profiled in order to obtain a matte finish of the resulting paper.

This second embodiment according to the present invention exhibits several additional advantages. First of all a printing step to apply the image onto the coated substrate can be easily integrated into a conventional cast-coat process without any considerable change of the already existing process.

Additionally, since the image is applied onto the coated substrate, image quality is extremely high, especially well defined inkjet printed images can be achieved. After re-wetting and contact with the chromium cylinder in a cast-coating process the image is sufficiently embedded in the coating to achieve good protection against environmental attack.

Since the finishing step is applied after application of the image the surface appearance is substantially the same over the entire surface irrespective whether looking on the image or on parts of the recording material that does not bear an image. Consequently, an excellent surface appearance of the recording material, bearing an image can be achieved. Additionally, as for all the other embodiments, described in this specification the final product is still printable.

According to a further embodiment of the present invention both above described embodiments can be combined in order to obtain a recording material that has an image positioned between substrate and coating and an additional image embedded in the coating adjacent to the outer surface of the coating.

Likewise it is understood by the person skilled in the art that according to the present invention several functional coatings can be applied and that between the substrate and the first functional coating and on each coating layer an image can be applied resulting in a maximum of n+1 embedded images if the number of functional coatings is n. But it is also understood that even if several functional coatings are applied it is not mandatory according to the present invention that an image is applied between the substrate and the first layer or between subsequent coating layers as long as there is at least one image applied.

The recording material according to the present invention can be used in order to achieve interesting esthetic effects for example a recording material can be made wherein a logo or an other design is already embedded in the coating of the recording paper, thus, showing a constant surface appearance over the entire surface of the recording material. This material then can be thereafter still be printed. This opens a whole lot of opportunities for designers to create interesting brochures, customer information sheets etc.

Another field of application for the present invention are security papers since information contained in the printed image embedded within the coating cannot be easily erased or altered without apparently damaging the material. Additionally, the resulting recording material is still printable so that additional information can be printed on that material.

Another application is to apply safety measures, for example images in a non-visible fluorescent dye.

DETAILED DESCRIPTION OF THE PREFERRED EMBODIMENT

Figure 1:
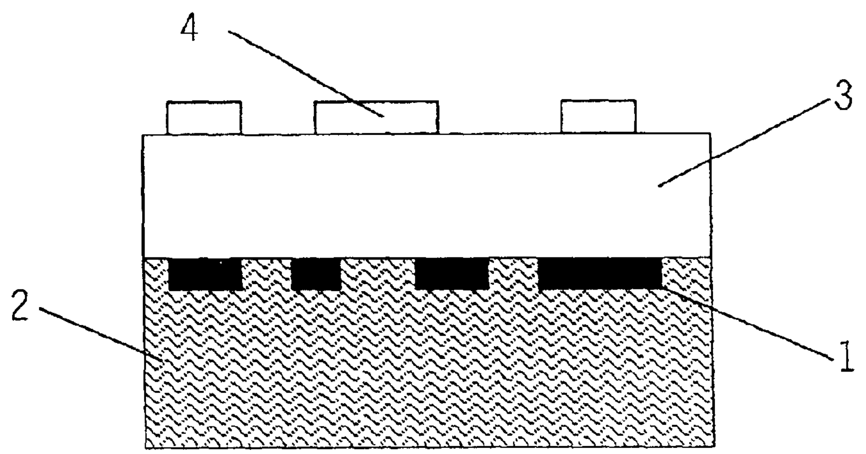
FIG. 1 is a schematic representation of the one embodiment of the present invention.

Referring to FIG. 1 an image 1 is applied for example by inkjet printing onto the base paper 2. Thereafter the coating 3 is applied and can finished by all known cast-coating processes like the direct, rewet or coagulation process, described above or by passing over a calendar roll. The resulting cast-coated paper is still printable and a further image 4 can be applied as seen in FIG. 1 by all usual printing methods.

Figure 2:
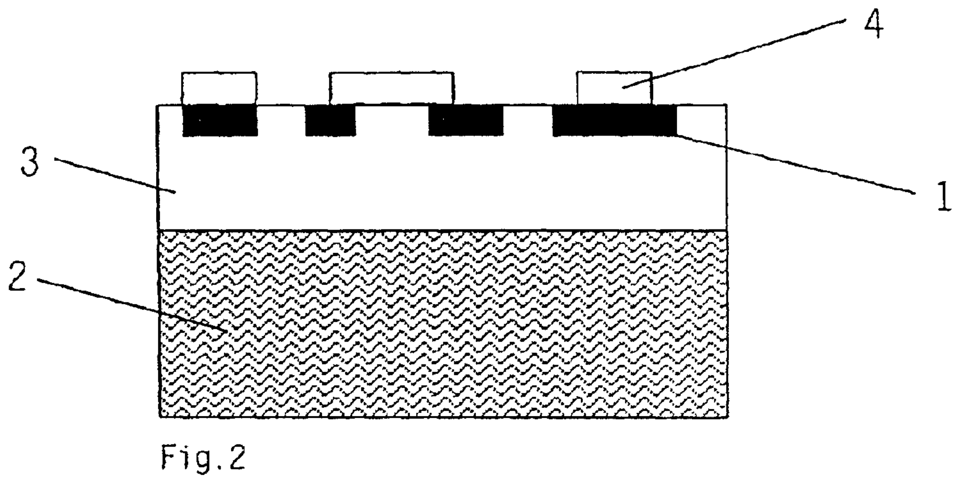
FIG. 2 is a schematic representation of the second embodiment of the present invention.

FIG. 2 refers to a second embodiment of the present invention, wherein the base paper 2 is directly coated and the coating 3 is dried. Onto the dried coating 3 an image 1 is applied. Thereafter, the printed paper is re-wetted and contacted with a heated cylinder in a cast-coating process. Thereby, as shown in FIG. 2 the image 1 is embedded in the coating 3 adjacent to the outer surface of the coating. Like for the embodiment according to FIG. 1 the paper is still printable.

Figure 3:
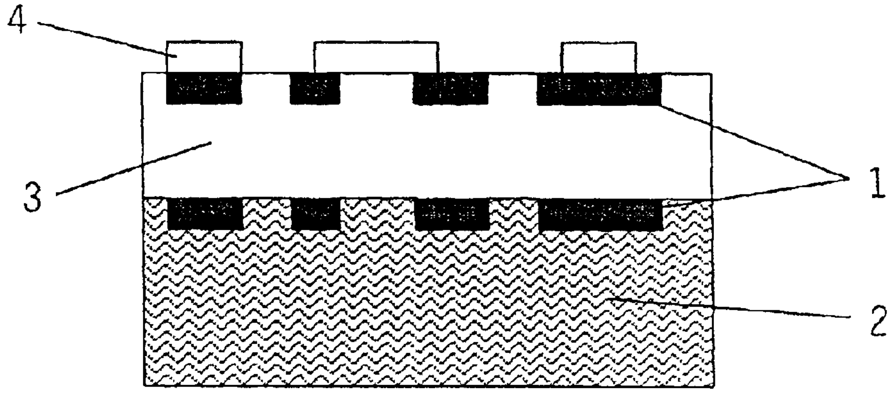
FIG. 3 is a schematic representation of the third embodiment of the present invention.

In FIG. 3 a third embodiment of the present invention is shown wherein, an image 1 is applied onto the base paper 2 as described for the first embodiment according to FIG. 1 and thereafter a second image 1 is embedded in the coating 3 adjacent to the outer surface by a cast-coating process as described for the embodiment according to FIG. 2.

The present invention will be described in more detail in the following example. The example is carried out by cast-coating in the special manner of the re-moistening method.

EXAMPLE

The amounts of substances used are stated as in "parts". "Parts" are to be understood as: parts by weight of oven-dry substance (oven-dry substance is obtainable by drying the relevant substance in an oven at a drying temperature of 105° C.). The statement "parts of water" is not affected by this definition.

A rosin sized base paper made by a Fourdrinier machine having a weight of 160 g/m$^2$ is used as a handsheet having a size of 21 cm in width and 40.0 cm in length for application of an image by inkjet printing. The base paper contains 15 parts of $CaCO_3$ particles as filler material additional to 100 parts of cellulosic fibres made up by an mixture of 65 parts softwood pulp and 35 parts hardwood pulp. The handsheet is printed by a commercial inkjet printer, for example Hewlett Packard DeskJet 870 Cxi, using any test patterns like figures, letters, pictures or uniform colouring. The printings show black as well as coloured patterns.

The coating composition for the cast-coating operation is made up as follows. A pigment mixture comprising 20 parts of satin white and 80 parts of commercial clay is dispersed in a stirred vessel with the addition of 4 parts of protein, 0.2 part of sodium polyacrylate dispersant, 0.1 part of sodium hydroxide solution, 1.2 parts of calcium hydroxide and 0.01 part of antifoam in the presence of 114 parts of water with formation of a pigment slurry having a concentration of 48% by weight, based on oven-dry substance. 20 parts of a commercial carboxylated styrene/butadiene copolymer as a binder, 0.3 part of an optical brightener and sufficient water to give a coating slip having a concentration of 44% by weight, based on oven dried substance, are added to the pigment slurry. The pH of the coating slip is adjusted to 11.5 with sodium hydroxide solution. The coating slip is applied in excess to the base paper. which has a basis weight of 160 g/m$^2$. By means of an Meyer-rod excess coating slip is removed in an amount such that the amount which corresponds to 22 g/m$^2$ dry weight (oven-dried) remains on the base paper. Thereafter, the coated paper is dried with hot air to a moisture content of 8%. Later on it is passed into a roll nip formed from a cylinder and an elastic pressure roll. There, the dry paper coat is moistened by contact with the aqueous remoistening solution, which is present in the roll nip, fed through feed nozzles and contains stearic acid, ammonium stearate and paraffin wax in a concentration of 0.5% by weight, and the coated side is pressed against the chromium-plated, highly polished and glossy surface of the cylinder at a temperature of 150° C. and nip pressure of 1000 N/cm. The web speed is 150 m/min. The handsheet dried on the cylinder is removed from the cylinder after passing through the heated pressure zone. The paper obtained from the Example shows high transparence of the coating layer in spite of its high amount of mineral pigments with very good visibility of the printed pattern and constant gloss throughout the entire surface irrespective when looked at a part of the paper that has not been covered by a pattern or at the pattern. The printed pattern is perfectly protected by the coating layer and the recording paper is still printable.

What is claimed is:

1. A recording material printable with standard inks comprising:

a substrate and at least one layer of functional coating on at least one side of the substrate so as to define an outermost surface, the coating comprising:

a binder and inorganic pigments in an amount of at least 50% by weight based on the dry weight of the coating wherein a first image is embedded in the coating and wherein a second image is printable on the outermost surface with the standard inks.

2. The printable recording material of claim 1, wherein the first image is positioned between the at least one layer of functional coating and the substrate.

3. The printable recording material of claim 1, wherein the first image is embedded in the at least one layer of functional coating adjacent the outermost surface.

4. The printable recording material of claim 1, wherein the material comprises a plurality of functional coating layers, a first functional coating layer being positioned adjacent the substrate and wherein the first image is positioned between the first functional coating layer and the substrate.

5. The printable recording material of claim 1, wherein the material comprises a plurality of adjacent functional coating layers on at least one side of the substrate wherein the first image is embedded between adjacent functional coating layers.

6. The printable recording material of claim 1, wherein the material comprises a plurality of adjacent functional coating layers on at least one side of the substrate wherein the first image is embedded in the outer surface of the outermost functional coating layer.

7. The printable recording material of claim 1, wherein the first image comprises at least one of dyes, inks, and toner particles.

8. The printable recording material of claim 7, wherein the first image is made of at least one of dyes and ink applied in solution.

9. The printable recording material of claim 8, wherein the solution comprises an aqueous solution.

10. The printable recording material claim 1, wherein the substrate comprises paper.

11. The printable recording material of claim 1, wherein the coating comprises:

(a) 5–50 wt. % of a binder;

(b) 50–95 wt. % of inorganic pigments;

(c) 0–45 wt. % of organic pigments; and (d) 0–10 wt. % of additives, the weight percentages being based on the dry weight of the coating.

12. The printable recording material of claim 10, wherein the material is a cast-coated paper.

* * * * *

UNITED STATES PATENT AND TRADEMARK OFFICE

CERTIFICATE OF CORRECTION

PATENT NO. : 6,869,658 B2
DATED : March 22, 2005
INVENTOR(S) : Becker, Franz Josef It is certified that error appears in the above-identified patent and that said Letters Patent is hereby corrected as shown below:

Title page,
Item [75], Inventor, should read -- Franz Josef Becker, Bergisch Gladbach (DE)"
Item [73], Assignee, should read -- Zanders Feinpapiere AG, Bergisch Gladback (DE) --

Signed and Sealed this

Ninth Day of August, 2005

JON W. DUDAS
*Director of the United States Patent and Trademark Office*

UNITED STATES PATENT AND TRADEMARK OFFICE

CERTIFICATE OF CORRECTION

PATENT NO. : 6,869,658 B2 Page 1 of 1
APPLICATION NO. : 09/952885
DATED : March 22, 2005
INVENTOR(S) : Franz Josef Becker It is certified that error appears in the above-identified patent and that said Letters Patent is hereby corrected as shown below:

Title Page item 73 should read -- Zanders Feinpapiere AG, Bergisch Gladbach (DE)--

Signed and Sealed this

Fourteenth Day of August, 2007

JON W. DUDAS
*Director of the United States Patent and Trademark Office*